(12) United States Patent
Lucas et al.

(10) Patent No.: US 8,112,224 B2
(45) Date of Patent: Feb. 7, 2012

(54) GUIDANCE SYSTEM FOR AN AIRCRAFT

(75) Inventors: Fabrice Lucas, Toulouse (FR); Jean-Louis De Menorval, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 1117 days.

(21) Appl. No.: 11/923,331

(22) Filed: Oct. 24, 2007

(65) Prior Publication Data
US 2008/0103647 A1 May 1, 2008

(30) Foreign Application Priority Data
Oct. 26, 2006 (FR) ...................................... 06 09409

(51) Int. Cl.
*G08G 5/04* (2006.01)
(52) U.S. Cl. .............. 701/301; 701/3; 701/16; 340/903; 340/945; 340/961; 244/76 R
(58) Field of Classification Search ............... 701/3, 301; 340/903, 945, 961; 244/76 R
See application file for complete search history.

(56) References Cited

U.S. PATENT DOCUMENTS

| | | | | |
|---|---|---|---|---|
| 5,121,325 A * | 6/1992 | DeJonge | ....................... | 701/123 |
| 5,408,413 A * | 4/1995 | Gonser et al. | .................. | 701/204 |
| 5,594,414 A * | 1/1997 | Namngani | ..................... | 340/436 |
| 6,507,782 B1 * | 1/2003 | Rumbo et al. | .................. | 701/121 |
| 6,546,338 B2 * | 4/2003 | Sainthuile et al. | ............. | 701/301 |
| 6,587,757 B2 * | 7/2003 | Sainthuile | ......................... | 701/1 |
| 6,718,236 B1 * | 4/2004 | Hammer et al. | .................. | 701/3 |
| 7,203,577 B2 * | 4/2007 | Gunn et al. | ........................ | 701/3 |
| 7,256,710 B2 * | 8/2007 | Mumaw et al. | ................. | 340/973 |
| 7,412,324 B1 * | 8/2008 | Bagge et al. | ................... | 701/120 |
| 7,437,225 B1 * | 10/2008 | Rathinam | ........................ | 701/14 |
| 2003/0050746 A1 | 3/2003 | Michael et al. | | |
| 2005/0230563 A1 * | 10/2005 | Corcoran, III | ............... | 244/175 |
| 2007/0061055 A1 * | 3/2007 | Stone et al. | ........................ | 701/2 |
| 2008/0249669 A1 * | 10/2008 | Skarman | ........................... | 701/3 |
| 2009/0088972 A1 * | 4/2009 | Bushnell | ........................ | 701/210 |

OTHER PUBLICATIONS

F. Bussink, et al. "A Fast-time simulation environment for airborne and spacing research," Digital Avionics Systems Conference, vol. 1, Oct. 24-28, 2004, pp. 3A4-31.
J. Hull, et al. "Technology-enabled airborne spacing and merging," Digital Avionics Systems Conference, Oct. 24-28, 2004, vol. 1, p. 2B4-21.
R. Barhydt, et al. "Handling trajectory uncertainties for airborne conflict management," Digital Avionics Systems Conference, Oct. 30, 2005, pp. 3B3-1.
R. Ehrmanntraut. "Towards an operational concept for integrated adaptive and predictive ATM," Digital Avionics Systems Conference Proceedings, Oct. 12-16, 2003, pp. 5E31-5E315.

* cited by examiner

*Primary Examiner* — Thomas Black
*Assistant Examiner* — Peter D Nolan
(74) *Attorney, Agent, or Firm* — Dickinson Wright PLLC

(57) ABSTRACT

The guidance system (1) comprises a first means (2) for guiding the aircraft while maintaining a spacing with another aircraft, a second means (3) for making the aircraft pass through a particular waypoint at a required passing time, and means (5) for selecting automatically one of said first and second means (2, 3).

9 Claims, 5 Drawing Sheets

GUIDANCE SYSTEM FOR AN AIRCRAFT

The present invention relates to a guidance system for an aircraft, in particular for a transport aircraft.

Even though not exclusively, the present invention applies more particularly to the guidance of aircraft, such as transport aircraft, civil ones in particular, during a phase of landing on an airport. It is known that such a landing phase is generally monitored and managed by air controllers. One of the tasks of an air controller is to ensure that a sequence of arrival times at a particular point (of convergence) in space is complied with by the different aircraft converging towards that particular point. This sequence of arrival times at that point can be provided to him or her, for example, by a usual system situated on the ground, which automates the planning of the traffic. The air controller must then give guidance instructions to the crews of the different aircraft, in order to maintain a satisfactory separation between two successive aircraft and in order to ensure that the different aircraft comply with the sequence of arrival times at said point of convergence with a certain precision.

In zones of high traffic density, such usual management of the sequencing represents a heavy workload for an air controller, which is made increasingly complex due to the continuous growth in air traffic.

Moreover, the time lapse between two successive instructions from the air controller to a same crew can become relatively long, of the order of a few tens of seconds, and can sometimes even be as long as one minute. Such a guidance of the aircraft, operated by instructions transmitted from the ground, does not therefore offer sufficient precision and must be compensated for by sufficiently long separation minima imposed between two aircraft. A disadvantage of this is of course that it increases the density of the airspace.

Moreover, such usual management of sequencing makes it possible to issue authorizations for paths which are optimized in terms of traffic flow management but does so to the detriment, in particular, of parameters specific to each aircraft, likely to be very sensitive, for example for air companies, such as fuel consumption, wear of engines, arrival time at the airport or sound emissions. In particular, it is known that, when there is very dense traffic, the air controller often has a very small deconfliction window (of the order of a few minutes) and frequently uses an approach called "path stretching" for sequencing the aircraft precisely. This usual technique consists in reducing or increasing the length of the path of an aircraft in order to adjust the time that the different aircraft pass a given point. Most times, such a procedure is carried out by radar guidance (or radar vectoring) by placing the aircraft in low-altitude level flight. This late adjustment of the path, associated with guidance not generated by a flight management system of the aircraft, does not make it possible to deliver an optimized path for said aircraft and often proves to be costly in terms of fuel consumption and environmental impact (sound emissions, etc.).

Automatic means exist for generating guidance instructions which make it possible to guide an aircraft whilst maintaining a predetermined spacing between that aircraft and another aircraft which precedes it. Such automatic means do not however make it possible to overcome the disadvantages described above.

The present invention relates to a guidance system for an aircraft, called the referent aircraft, which makes it possible to overcome the aforesaid disadvantages.

For this purpose, according to the invention, said guidance system of the type comprising a first guidance means which is able to generate automatically first guidance commands which make it possible to guide the referent aircraft whilst maintaining at least a predetermined spacing between that referent aircraft and at least one other aircraft, called the target aircraft is noteworthy in that it furthermore comprises:
- a second guidance means which is able to generate second guidance commands which make it possible to guide the referent aircraft such that it passes through at least one particular waypoint at a required passing time;
- detection means which are able to detect automatically a risk of collision between the referent aircraft and another aircraft; and
- selection means which are able to select automatically one of said first and second guidance means which is then used for guiding said referent aircraft and which are produced in such a way as to select:
  - said second guidance means during a normal flight situation, in the absence of detection of a risk of collision by said detection means; and
  - said first guidance means during a situation of danger, when said detection means detect a risk of collision, said first guidance means then being selected for as long as that risk of collision subsists.

According to the invention, said guidance system furthermore comprises means of actuating control devices of the aircraft, which receive and apply the guidance commands generated by the (first or second) guidance means which is currently selected (by the intermediary of said selection means).

Thus, due to said second guidance means, the guidance system according to the invention is able to ensure, with a desired level of accuracy and a certain level of probability, an arrival time of the aircraft at one or more of any (way) points in space, in particular a usual point of convergence for aircraft during a landing on an airport.

Moreover, due to the invention, the referent aircraft can be guided on a flight path integrating time restraints which are calculated by a usual flight management system of the aircraft and which are thus optimized (in the usual manner) in particular with regard to fuel consumption, wear of the engines and environmental impact.

Moreover, according to the invention, as soon as there appears a risk of collision between the referent aircraft and another aircraft (target aircraft) which precedes it, the guidance system automatically utilizes, due to said detection means and to said selection means, said first guidance means which makes it possible to confer on said referent aircraft a predetermined (minimal) spacing with respect to said (target) aircraft that precedes it. This makes it possible to exclude any risk of collision for a referent aircraft equipped with a guidance system according to the invention. Moreover, said first guidance means is used only as long as a risk of collision subsists. For the rest of the guidance the guidance system utilizes said second guidance means which makes it possible to obtain the aforesaid important advantages.

The predetermined minimal spacing between a referent aircraft and a target aircraft can be defined in several ways. The inputs can for example be entered manually by the pilot. It is also possible to envisage them following an air/ground negotiation and resulting from the acceptance by the pilot of authorizations sent from the ground via a communications system of the CPDLC (Controller Pilot Data Link Communications) type. With regard to the function making it possible to maintain a predetermined minimal spacing, the minimal spacing value imposed by the control within the part of the reference path with a "4D segment" or an "RTA segment" can also be encoded in a navigation database. Moreover, it is possible to enter a tolerance associated with the compliance with said predetermined minimal spacing. In the case where a tolerance associated with the minimal spacing value imposed by the control could be adjustable by inputting into the flight management system, it is also possible to consider the following means for defining the tolerance value: activation of an option of the OPC (Operational Program Configuration) type and encoding in the navigation database.

It will be noted that, when several aircraft are equipped with a guidance system according to the invention, an air controller can create a train of aircraft without risk of conflict, by delivering to each of them an instruction in a common zone of airspace, and can do so simply by providing to the various waypoints (used by said second guidance means) passing times offset by a certain period. Thus the air controller's workload is greatly reduced, since the temporal guidance of the aircraft is carried out each time by an on-board guidance system and no longer indirectly by guidance instructions given by the air controller. It is thus possible to reduce the separation between aircraft, and therefore to increase the density of the airspace, without by so doing increasing the workload of the air controller.

In a particular embodiment, said guidance system furthermore comprises:
  display means for displaying, on at least one display screen, information indicating at least the guidance means which is currently selected; and
  means for entering data at least into said second guidance means.

The guidance system according to the invention can be part of a navigation system of the referent aircraft.

Moreover, in a first embodiment of the invention, which is intended for a referent aircraft which is following the same flight path as at least one target aircraft, said flight path exhibiting a plurality of successive waypoints, said detection means are advantageously produced in such a way as to check the existence of a risk of collision between the referent aircraft and the target aircraft at least one particular waypoint of said flight path, representing a test point. A waypoint corresponds either to a route point, or to any point of the flight path.

In this case, said detection means advantageously comprise:
  a first element for determining a first passing time corresponding to the time at which said target aircraft passes said test point;
  a second element for determining a second passing time corresponding to the time at which said referent aircraft passes said test point;
  a computing element for determining, from said first and second passing times, a time spacing between the two aircraft, the referent aircraft and the target aircraft, at said test point; and
  a comparison element for comparing this time spacing with a predetermined spacing value and for deriving from this:
    the existence of a risk of collision (making it possible to command the selection of said first guidance means), when said time spacing is less than said spacing value; and
    the absence of a risk of collision (making it possible to command the selection of said second guidance means), when said time spacing is greater than or equal to said spacing value.

In a first variant embodiment:
said first element comprises:
  means for receiving said first passing time from said target aircraft, said target aircraft having measured this first passing time when passing through said test point; and
  means for recording this first passing time; and
said second element comprises means for measuring said second passing time when said referent aircraft passes through said test point.

Moreover, in a second variant embodiment:
said first element comprises:
  means for receiving said first passing time from said target aircraft, said target aircraft having measured this first passing time when it passed through said test point; and
  means for recording this first passing time; and
said second element comprises means for predicting said second passing time.

Moreover, in a second embodiment of the invention, which is intended for a referent aircraft which is following a flight path different from that followed by at least one target aircraft, the two flight paths meeting however at a point of convergence, said detection means are advantageously produced in such a way as to check the existence of a risk of collision between the referent aircraft and the target aircraft at said point of convergence.

In this case, said detection means advantageously comprise:
  a first element for receiving and recording a first passing time corresponding to the passing time measured on said target aircraft when it passes said point of convergence;
  a second element for predicting a second passing time corresponding to the passing time, estimated in advance, of said referent aircraft at said point of convergence;
  a computing element for determining, from said first and second passing times, a time spacing between the two aircraft, the referent aircraft and the target aircraft, at said point of convergence; and
  a comparison element for comparing this time spacing with a predetermined spacing value and for deriving from this:
    the existence of a risk of collision (making it possible to command the selection of said first guidance means), when said time spacing is less than said spacing value; and
    the absence of a risk of collision (making it possible to command the selection of said second guidance means), when said time spacing is greater than or equal to said spacing value.

In the context of the present invention, said second guidance means can be produced according to different embodiments.

In a first embodiment, said second guidance means comprises elements for carrying out a temporal control of the referent aircraft for the purpose of making it pass through a waypoint at a required passing time of the RTA (Required Time of Arrival) type, this control (which is carried out by adjusting the speed of the referent aircraft) being relative to a single waypoint and being carried out between the time when data allowing said control are entered and the passing of the referent aircraft through said waypoint.

Moreover, in a second embodiment, said second guidance means comprises elements for carrying out a temporal control of the referent aircraft for the purpose of making it pass through at least one waypoint at a required passing time, this control being carried out solely over a particular segment of the flight path of the referent aircraft.

In this second embodiment, the guidance system according to the invention therefore guides the aircraft by carrying out temporal control (by adjusting its speed), in order to make said aircraft pass through each waypoint in question at the required passing time, and to do so within a margin of error.

Moreover, according to the invention, the speed fluctuation used on the aircraft in such a way as to allow it to reach the preceding objective is limited to said particular segment. This fluctuation is therefore limited in space and in time. This is not the case if there is supplied simply a required time of arrival (RTA) to a flight management system of the aircraft, as in said first embodiment, since in this case the speed modification is used as soon as said RTA time is input and this continues until the arrival at the corresponding waypoint.

This second embodiment therefore allows an air controller to know and to impose, with a precision level adapted to the controlled zone, the passing time of a referent aircraft at one or more predefined waypoints of a particular segment, whose limits (starting point and end point) are adjustable. Time is controlled within said particular segment, and the impact of modified guidance for temporal control is restricted to a zone which can thus be known by the air controller. This adjustable limitation, in space, of the part of the flight path where the guidance of the aircraft is temporally controlled, is very advantageous. In fact, it particularly makes it possible to assist the air controller:

to anticipate better the development of the traffic (by a widening of the deconfliction window); and to sequence the aircraft more accurately, whilst limiting the risks of conflict between two consecutive aircraft.

The figures of the appended drawings will give a good understanding of how the invention may be embodied. In these figures, identical references indicate similar elements.

Figure 1:
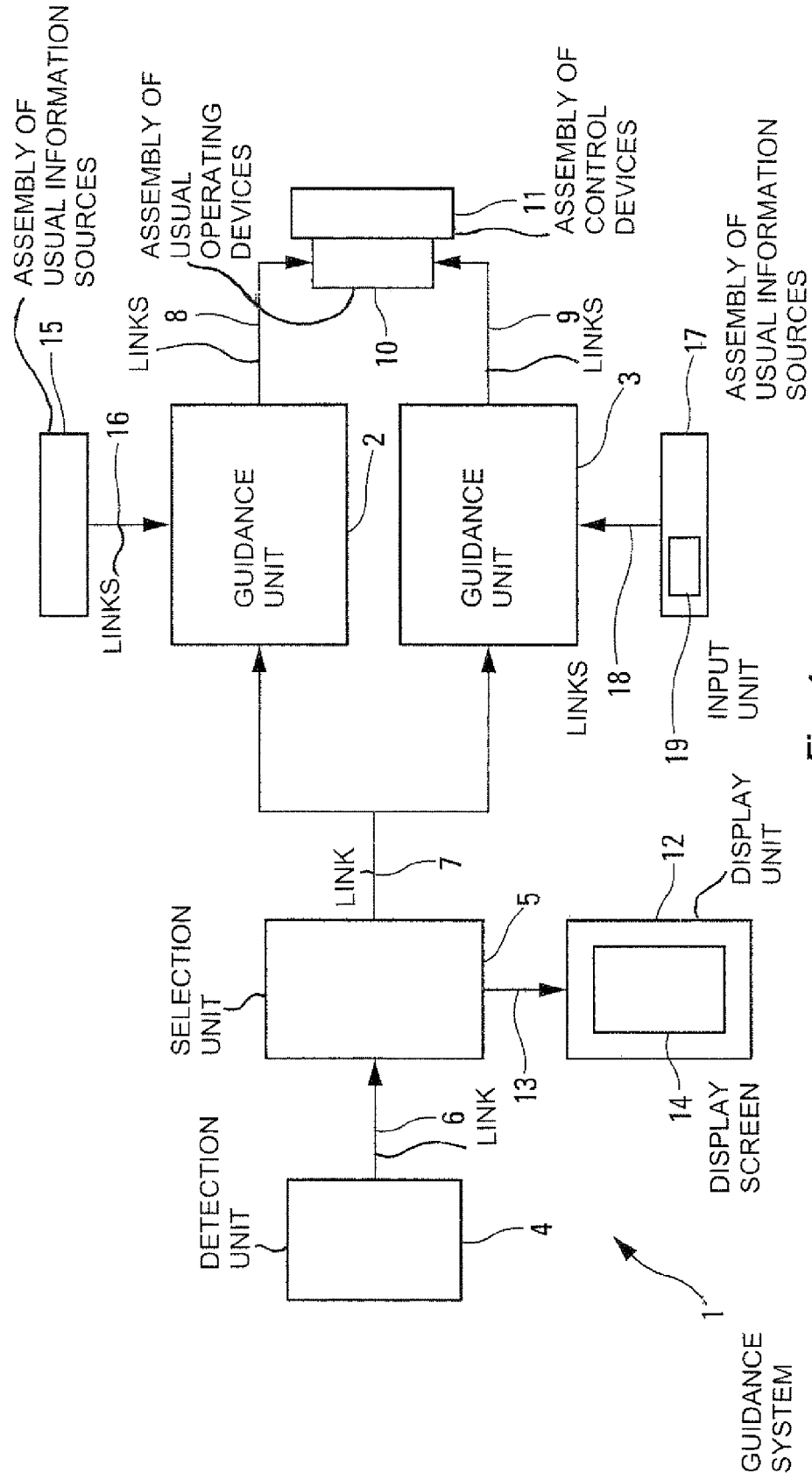
FIG. 1 is the block diagram of a guidance system according to the invention.

The guidance system 1 according to the invention and shown diagrammatically in FIG. 1 is intended to guide an aircraft A, called the referent aircraft, in particular a (civil or military) transport aircraft.

Figure 2:
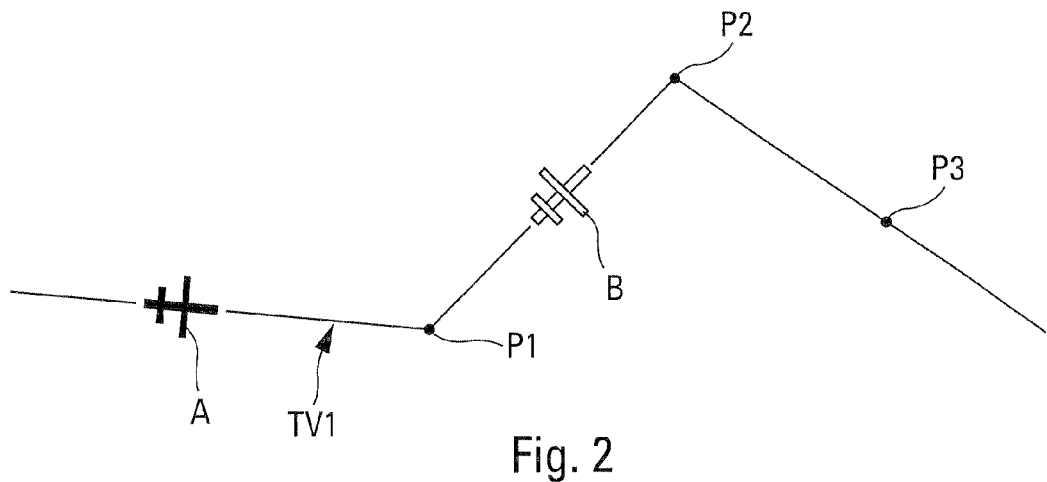
FIG. 2 is a diagrammatic illustration of a first application of a guidance system according to the invention.

According to the invention, this guidance system 1 which is installed in the referent aircraft A comprises:

a guidance means 2, of usual type, which comprises usual guidance laws and which is able to generate automatically first guidance commands which make it possible to guide the referent aircraft A, whilst maintaining at least a predetermined spacing between that referent aircraft A and at least one other aircraft B, called the target aircraft. This guidance means 2 which is known and which uses usual guidance laws is not described further in the present description;

a guidance means 3 which comprises special guidance laws and which is able to generate automatically second guidance commands which make it possible to guide the referent aircraft A such that it passes through at least one particular waypoint P1, P2, P3 of a flight path TV1 followed, as represented by way of example in FIG. 2;

detection means 4 described below, which are able to detect automatically a risk of collision between the referent aircraft A and a target aircraft B; and selection means 5 which are connected by the intermediary of a link 6 to said detection means 4, and which are able to select automatically, by the intermediary of a link 7, one of said guidance means 2 and 3 which is then used for guiding said referent aircraft A. According to the invention, said selection means 5 are produced in such a way as to select:

said guidance means 3 during a normal flight situation, in the absence of detection of a risk of collision by said detection means 4; and said guidance means 2 during a situation of danger, when said detection means 4 detect a risk of collision. Said guidance means 2 is then selected for as long as that risk of collision subsists.

In order to be able to apply the guidance commands that they generate to the referent aircraft A, said guidance means 2 and 3 are connected in the usual manner, by the intermediary of links 8 and 9 respectively to an assembly 10 of usual operating means, which are able to operate in the usual manner an assembly 11 of control devices of the aircraft A, able to act on the flight of the latter, such as control surfaces (rudder, ailerons, elevators) for example. Said operating means therefore receive in real time the (first and second) guidance commands produced by the guidance means 2 or 3 which is currently selected by the selection means 4 and operate said control devices correspondingly.

Thus, due to said guidance means 3, the guidance system 1 according to the invention is able to ensure, with a desired level of accuracy and a certain level of probability, a time of arrival of the aircraft A at any one or more (way) points in space, in particular a usual point of convergence for aircraft during a landing on an airport.

Moreover, according to the invention, as soon a risk of collision between the referent aircraft A and another aircraft (target aircraft B) preceding it appears, the guidance system 1 automatically uses, due to said detection means 4 and to said selection means 5, said guidance means 2 which makes it possible to confer on said referent aircraft A a predetermined (minimal) spacing with respect to said target aircraft B which precedes it. This makes it possible to exclude any risk of collision for a referent aircraft A equipped with a guidance system 1 according to the invention. Moreover, said guidance means 2 is used only as long as a risk of collision subsists. For the rest of the guidance, the guidance system uses said guidance means 3 which makes it possible to obtain important advantages.

Figure 5:
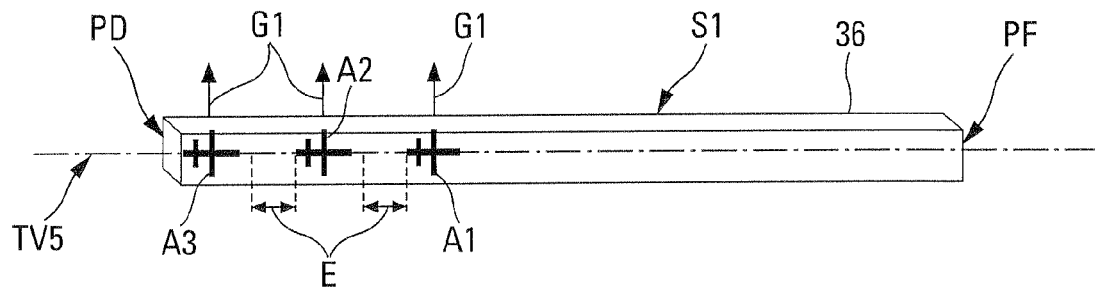
FIGS. 5 to 10 are diagrams which show successive situations during a particular application of guidance systems according to the invention on a plurality of aircraft.

It will be noted that, when several aircraft A1, A2, A3 are equipped with a guidance system 1 according to the invention, as shown for example in FIG. 5, an air controller can create a train of aircraft without risk of conflict by delivering to each one of them an instruction in a common zone of airspace and can do so by simply providing to the various waypoints (used by said guidance means 3) passing times that are offset by a certain duration. Thus, the workload of the air controller is greatly reduced, since the temporal guidance of the aircraft A1 to A3 is carried out each time by an on-board guidance system 1 and no longer indirectly by guidance instructions given by the air controller. It is thus possible to reduce the separation between aircraft and therefore to increase the density of the airspace without by so doing increasing the workload of the air controller.

The guidance system 1 according to the invention can form part of a navigation system (not shown) of the referent aircraft A.

In a particular embodiment, said system 1 furthermore comprises:

- display means 12 which are connected by the intermediary of a link 13 for example to said selection means 5 and which are able to display, on a display screen 14, information indicating at least the guidance means 2 or 3 which is currently selected;
- an assembly 15 of usual information sources, which is connected by the intermediary of a link 16 to said guidance means 2; and
- an assembly 17 of usual information sources, which is connected by the intermediary of a link 18 to said guidance means 3.

In a particular embodiment, said assembly 17 of information sources can comprise means 19 which make it possible to input data into said guidance means 3.

In a particular variant embodiment, said input means 19 comprise means, such as an alphanumeric keyboard for example, which allow an operator, in particular the pilot of the aircraft A, to input data into said guidance means 3 directly in the usual manner.

In another variant embodiment, said means 19 can comprise data receiving means, which make it possible to receive automatically from outside of the aircraft A, in particular from the ground, data to be entered. In this case, the reception of an item of information results from the acceptance by the pilot of an authorization sent from the ground for example by the intermediary of a pilot/controller data transmission system of the CPDLC (Controller Pilot Data Link Communications) type, which is associated with said receiving means.

In the context of the present invention, said guidance means 3 can be produced according to different embodiments.

In a first embodiment, said guidance means 3 comprises elements for carrying out a temporal control of the referent aircraft A for the purpose of making it pass through a waypoint at a required passing time of the RTA (Required Time of Arrival) type. This control (which is carried out by adjusting the speed of the referent aircraft A) is relative to a single waypoint and is carried out between the time when data is entered allowing said control and the passing of the referent aircraft A through said waypoint in question.

Moreover, in a second embodiment, said guidance means 3 comprises elements for carrying out a temporal control of the aircraft A for the purpose of making it pass though at least one waypoint at a required passing time. This control is carried out solely over a particular segment of the flight path of the referent aircraft A, such as for example the segment S1 of the flight path TV5 shown in FIGS. 5 to 10.

In this second embodiment, the guidance system 1 according to the invention therefore guides the referent aircraft A by carrying out a temporal control (by adjusting its speed), in order to make said referent aircraft A pass through each waypoint considered at the required time and to do so within a margin of error. Moreover, according to the invention, the speed fluctuation used on the aircraft A in order to allow it to achieve the preceding objective is therefore limited to said particular segment S1. This fluctuation is thus limited in space and in time. This is not the case if there is simply provided a required time of arrival (RTA), as in the aforesaid first embodiment, since in this case the speed modification is used as soon as said RTA time is entered and this happens until the arrival at the corresponding waypoint.

Figure 8:
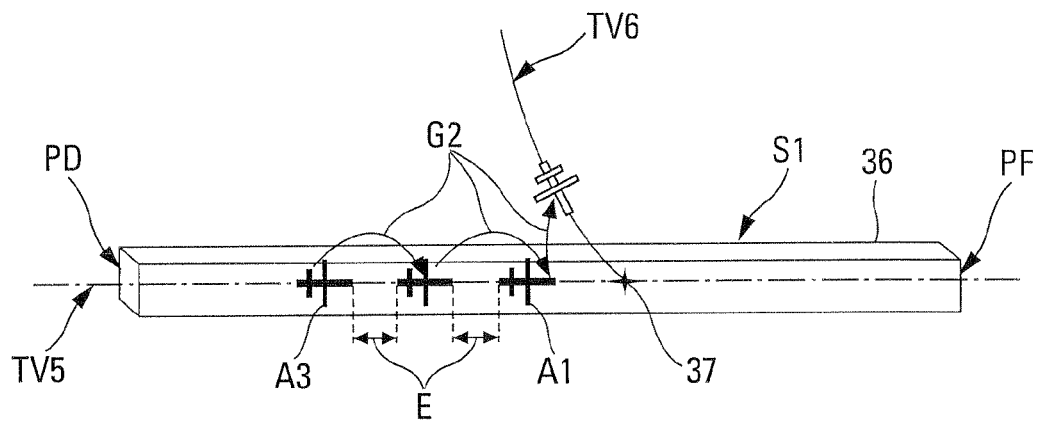

This second embodiment therefore makes it possible for an air controller to know and to impose with a level of accuracy adapted to the controlled zone the time of passage of an referent aircraft A through one or more predefined waypoints of a particular segment S1, whose limits (start point PD and end point PF such as shown in FIGS. 5 and 8) can be adjusted. Time is controlled within said segment S1 and the impact of modified guidance on the temporal control is restricted to a zone which can thus be known by the air controller. This adjustable limitation, in space, of the part (segment S1) of the flight path TV5 where the aircraft A is time controlled, is very advantageous. In fact, it makes it possible in particular to assist the air controller:

- to better anticipate the development of the traffic (by a widening of the deconfliction window); and
- to sequence the aircraft more precisely, whilst limiting the risks of conflict between two consecutive aircraft.

In a first application of the invention shown diagrammatically in FIG. 2 which illustrates a lateral plane (or horizontal plane), the referent aircraft A which is equipped with said guidance system 1 according to the invention is following the same flight path TV1 as at least one target aircraft B which precedes it. This flight path TV1 comprises a plurality of successive waypoints P1, P2, P3.

Figure 3:
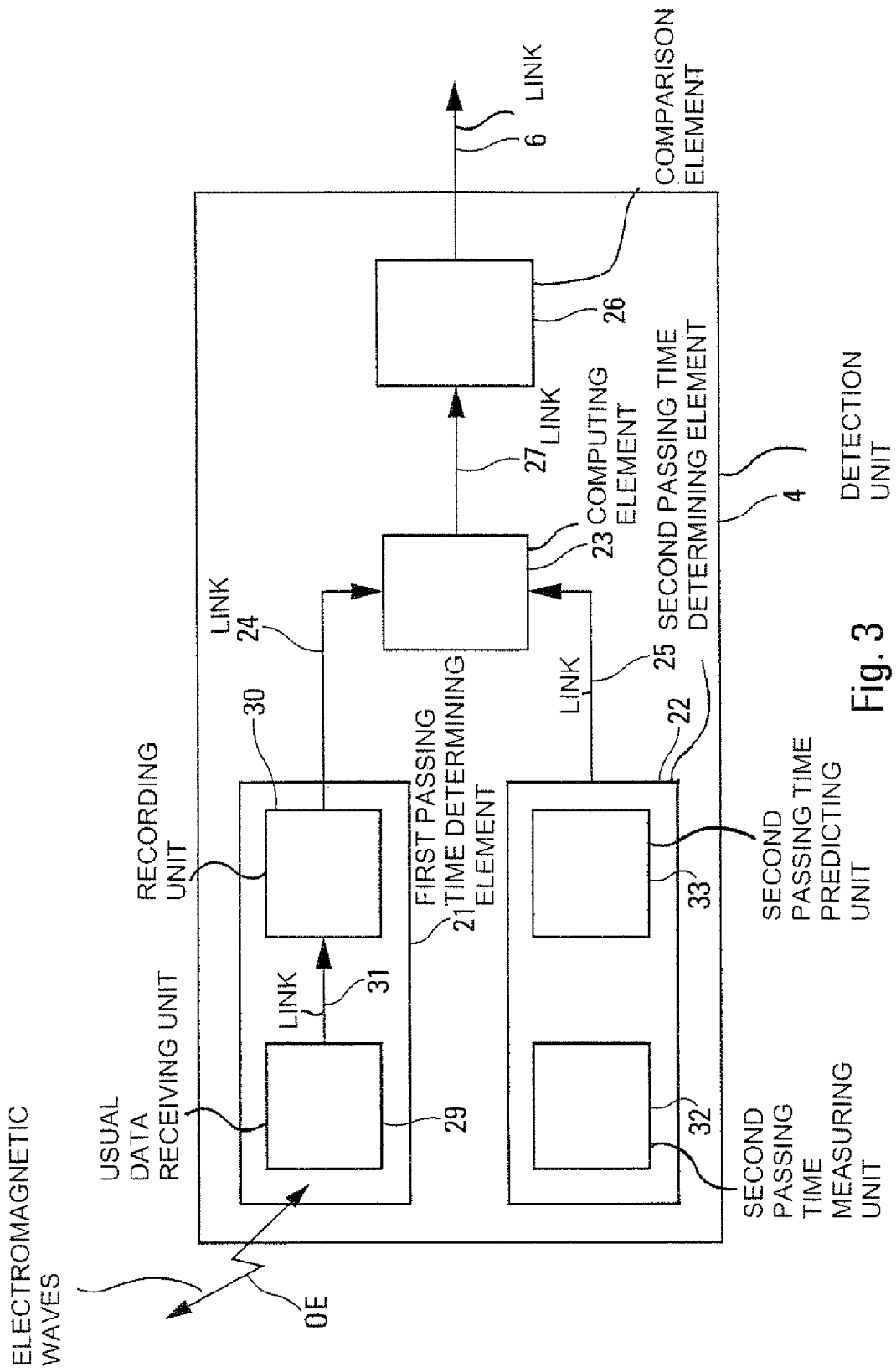
FIG. 3 is the block diagram of a particular embodiment of detection means forming part of a guidance system according to the invention.

In this case, said detection means 4 are formed in such a way as to check the existence of a risk of collision between the referent aircraft A and the target aircraft B, at one or more of said waypoints of the flight path TV1. Each waypoint chosen for carrying out a check is considered hereafter as being a test point. In this case, the detection means 4 comprise, as shown in FIG. 3:

- an element 21 for determining a first passing time which corresponds to the passing time of the target aircraft B at a test point;
- an element 22, described below, for determining a second passing time which corresponds to the passing time of the referent aircraft A at said test point;
- a computing element 23 which is connected by the intermediary of links 24 and 25 to said elements 21 and 22 respectively and which is produced in such a way as to determine, from said first and second passing times received from said elements 21 and 22, a time spacing between the two aircraft A and B at said test point. In order to do this, in a particular embodiment, said computing means 23 determine the time difference between said first and second passing times; and
- a comparison element 26 which is connected by the intermediary of a link 27 to said computing means 23, which compares this time spacing with a predetermined spacing value, and which derives from this:
  - the existence of a risk of collision making the selection of said guidance means 2 obligatory, when said time spacing is less than said spacing value; and
  - the absence of a risk of collision making it possible to select said guidance means 3, when said time spacing is greater than or equal to said spacing value.

In a preferred embodiment, said element 21 comprises:

usual data receiving means 29, which are able to receive data from a target aircraft B in the form of electromagnetic waves OE. In this case, said means 29 receive from said aircraft B said passing time which the latter measured directly when it passed said test point. In order to do this, said target aircraft B must of course be equipped with appropriate measuring means and with data transmission means cooperating with said data receiving means 29; and usual means 30, which are connected by the intermediary of a link 31 to said means 29 and which are able to record said first passing time received from said means 29, which will then be transmitted to said computing element 23.

On the other hand, said element 22 can be embodied according to two different variant embodiments.

According to a first simplified variant embodiment, said element 22 comprises usual means 32 for measuring said second passing time directly on the referent aircraft A when it passes said test point. This first variant embodiment is particularly simple, but it does not make it possible to anticipate a risk of collision. This can possibly delay the detection of a risk of collision.

Moreover, according to a preferred second variant embodiment, said element 22 comprises means 33 for predicting said second passing time. These means 33 therefore estimate in advance, that is to say before the passage of the referent aircraft A through said test point, the assumed passing time of said aircraft A though said test point. In order to do this, said means 33 predict said second passing time in the usual manner, in particular by taking account of the current distance between the referent aircraft A and said test point, of the current speed of the referent aircraft A and of a usual prediction of the wind at said test point P1.

This second variant embodiment makes it possible to refine the detection of a risk of collision by making it possible to carry out the calculations relating to any test point P1 early. Thus, the detection can be carried out (early) for a plurality of different test points, and this can be done from the moment the system 1 knows the (first) passing time of the aircraft B through these test points.

Figure 4:
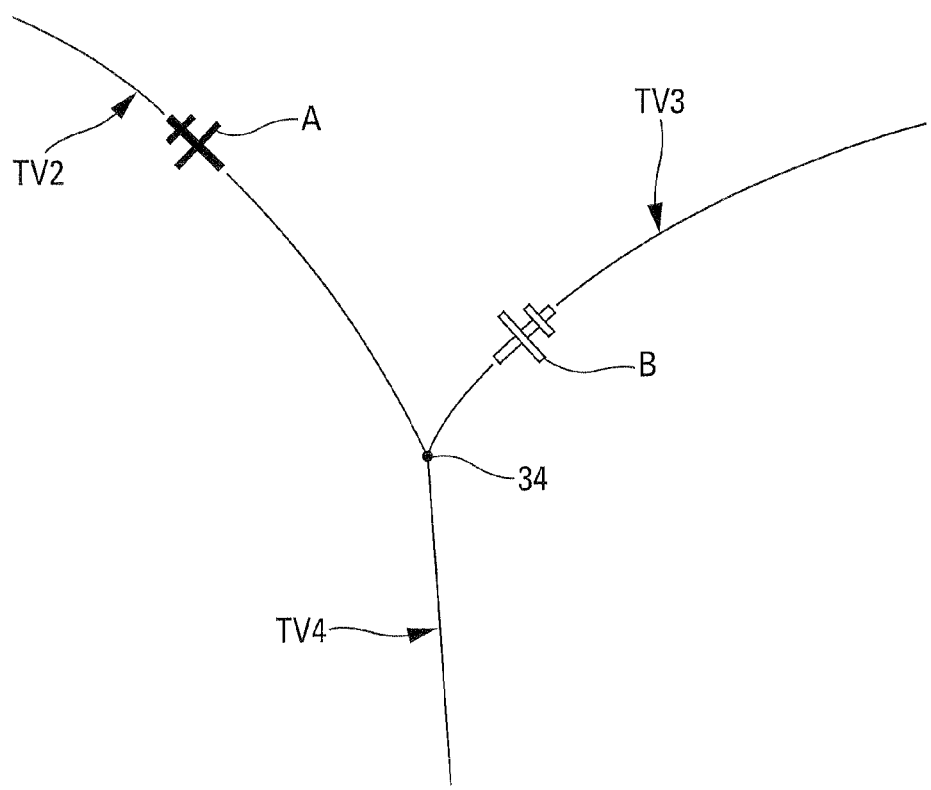
FIG. 4 is a diagrammatic illustration of a second application of a guidance system according to the invention.

Moreover a second application of the invention, shown diagrammatically in FIG. 4, relates to a referent aircraft A which is following a flight path TV2 which is different from the flight path TV3 followed by a target aircraft B but which is such that this flight path TV2 and said flight path TV3 meet at a point of convergence 34. This application can, in particular, relate to the final approach to an airport for the purpose of a landing on a runway. In this case, the point of convergence 34 is a usual point of convergence from which the final approach phase (along a path TV4) and the actual landing of the aircraft A and B on a runway (not shown) are carried out.

In this second application, only the aforesaid second variant embodiment of the element 22, that is to say comprising the means 33, can be used. In fact, it is not possible to envisage waiting for the referent aircraft A to arrive at the point of convergence 34 in order to know if a risk of collision does or does not exist. It is therefore necessary to predict, in advance, the time spacing between the two aircraft A and B at said point of convergence 34. In this case, the guidance system 1 uses the aforesaid processings relating to said second variant embodiment of the element 22. However, the processings are not used for a particular waypoint P1, but for said point of convergence 34.

Moreover, it will be noted that, in general, the function which makes it possible to maintain a predetermined minimal spacing has, just like the temporal guidance function, input parameters. The means 19 which exist for the entry of input parameters of the temporal guidance function also exist for this function of maintaining the predetermined minimal spacing. These inputs are at least:
 a predetermined minimal spacing;
 a tolerance applied to this predetermined minimal spacing; and
 a target aircraft.

FIGS. 5 to 10 illustrate successive situations showing a possible scenario in which switchovers appear (commanded by the selection means 5) between the guidance means 2 and 3. In this example, three referent aircraft A1, A2 and A3 are each equipped with a guidance system 1 according to the invention. They constitute a train of aircraft. In the normal situation of FIG. 5, the three aircraft A1 to A3 are each guided with the assistance of said guidance means 3 in such a way as to pass through particular waypoints of a followed flight path TV5, at required passing times, and to do so within a segment S1 which is indicated in FIGS. 5 to 10 by a tube 36. This segment S1 comprises a known start point PD and a known end point PF.

In FIGS. 5 to 10, there is indicated:
 guidance of a referent aircraft A1 to A3 which is used by said guidance means 3, by means of a vertical arrow G1; and
 a minimal spacing between successive aircraft, by means of a double-headed arrow E.

In the situation of FIG. 5, the referent aircraft A1 to A3 follow each other by each using temporal control with the assistance of the guidance means 3. This temporal control is such that the spacing between two successive aircraft remains greater than said minimal spacing E.

Figure 6:
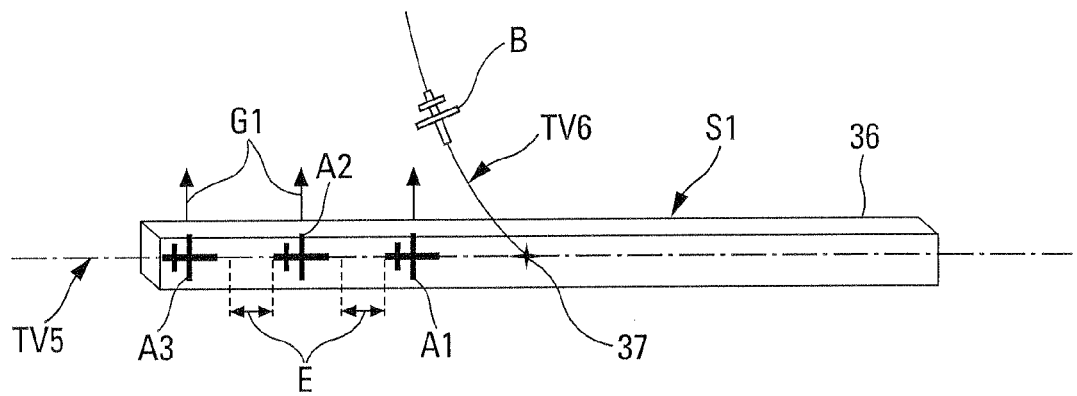
Figure 7:
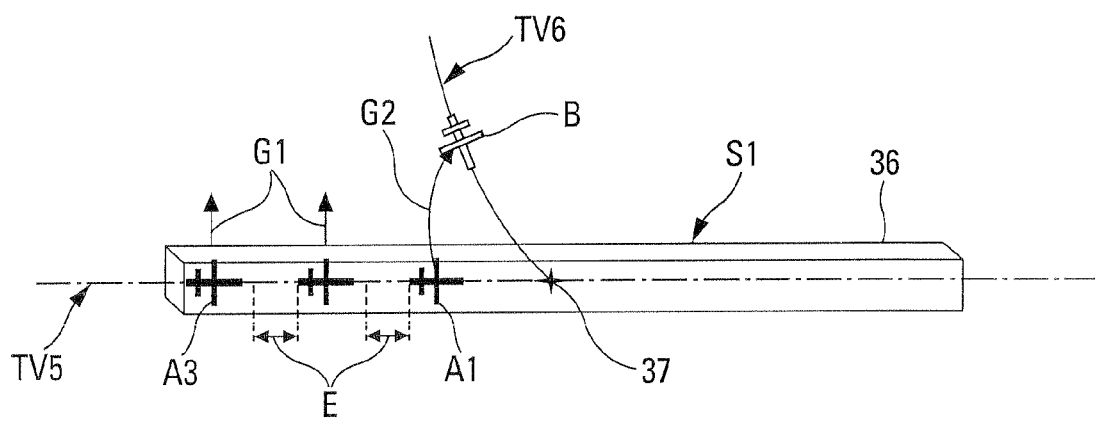
Figure 9:
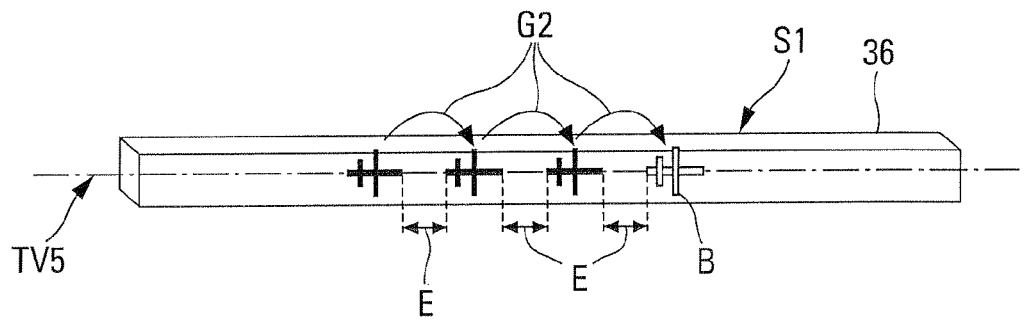

The air controller then wishes to insert, as a matter of priority, at the head of the train, a target aircraft B following a flight path TV6, as shown in FIG. 6. This target aircraft B has for example been diverted and wishes to arrive as quickly as possible at its new destination. In this case, the air controller supplies the aircraft B with guidance instructions and he indicates to the referent aircraft A1 a minimal spacing to be implemented with respect to said aircraft B at a point of convergence 37 (where the flight paths TV5 and TV6 join together) and throughout the whole of the flight after this point of convergence 37. At that time, the aircraft A1 to A3 are still guided by the guidance means 3. As shown in FIG. 7, the aircraft B quickly arrives at the point of convergence 37. The detection means 4 of the guidance system 1 of the reference aircraft A1 then detect a risk of collision at said point of convergence 37, that is to say they detect that there is a risk that the spacing between the aircraft B and the aircraft A1 is less than the minimal spacing value imposed by the air controller at that point of convergence 37. The selection means 5 then command a switchover from the guidance means 3 to the guidance means 2 on the aircraft A1 such that the latter can maintain an imposed minimal spacing with respect to said aircraft B at said point of convergence 37. In FIGS. 7 to 9, guidance (of a referent aircraft A1, A2, A3), which is carried out by means of the guidance means 2, is indicated by the rounded arrows G2.

The referent aircraft A1 which must at present maintain a spacing with respect to the aircraft B therefore exhibits a lower speed than initially predicted. As the referent aircraft A2 is temporally guided, it becomes increasingly closer to that referent aircraft A1 and this continues until the moment when the detection means 4 of said referent aircraft A2 detect a risk of collision. At that moment, a switchover of the guidance of the referent aircraft A2 is carried out. The latter is then guided with the assistance of the guidance means 2 such that it reduces its speed in such a way as to maintain a minimal spacing with respect to said aircraft A1. This scenario is repeated for the aircraft A3. Thus, a little while later, as represented in FIG. 8, all of the referent aircraft A1, A2 and A3 are guided with the assistance of said guidance means 2.

The aircraft B is then inserted at the head of the train of aircraft along the flight path TV5, as shown in FIG. 9. This aircraft B is still guided by instructions from the air controller. With regard to the aircraft A1 to A3, they are guided in such a way as to comply with a minimal spacing, with the assistance of their on-board guidance system 1.

Figure 10:
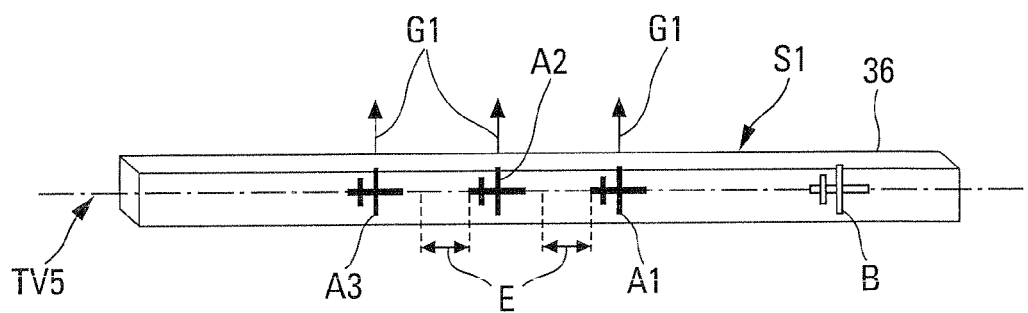

In order to arrive as quickly as possible at its destination, the aircraft B flies at a high speed and in particular higher than the speed of the referent aircraft A1. Thus, at a later time, the risk of collision disappears and a new switchover of the guidance is carried out such that the aircraft A1 is again guided with the assistance of the guidance means 3. This phenomenon is repeated in cascade for the aircraft A2 and the aircraft A3 which will switch back to guidance by temporal control implemented by the guidance means 3 as shown in FIG. 10. A situation similar to the initial situation shown in FIG. 5 is therefore reestablished.

The invention claimed is:

1. A guidance system for a referent aircraft, said guidance system comprising a first guidance unit configured to generate automatically first guidance commands to guide the referent aircraft while maintaining at least a predetermined spacing between the referent aircraft and at least one target aircraft, the guidance system further comprising:
   a second guidance unit configured to generate second guidance commands to guide the referent aircraft such that the referent aircraft passes through at least one particular waypoint at a required passing time;
   a detection unit configured to detect automatically a risk of collision between the referent aircraft and the at least one target aircraft; and
   a selection unit configured to select automatically one of said first and second guidance units, said selected one of said first and second guidance units to then be used for guiding said referent aircraft, said selection unit being configured to select:
   said second guidance unit during a normal flight situation, in the absence of detection of the risk of collision by said detection unit; and
   said first guidance unit during a situation of danger, when said detection unit detects the risk of collision, said first guidance unit then being selected for as long as the risk of collision subsists,
   wherein when the referent aircraft is following the same flight path as the at least one target aircraft, said flight path exhibiting a plurality of successive waypoints, said detection unit is configured to check for the existence of the risk of collision between the referent aircraft and the at least one target aircraft at a location corresponding to at least one particular waypoint of said flight path, representing a test point,
   wherein said detection unit comprises:
   a first element for determining a first passing time corresponding to a time at which said at least one target aircraft passes said test point;
   a second element for determining a second passing time corresponding to a time at which said referent aircraft passes said test point;
   a computing element for determining, from said first and second passing times, a time spacing between the referent aircraft and the at least one target aircraft, at said test point; and
   a comparison element for comparing the time spacing with a predetermined spacing value and for deriving from the comparison:
   the existence of the risk of collision when said time spacing is less than said predetermined spacing value, in which case the selection unit selects said first guidance unit; and
   the absence of the risk of collision when said time spacing is greater than or equal to said predetermined spacing value, in which case the selection unit selects said second guidance unit, wherein:
   said first element comprises:
   a first passing time receiving unit for receiving said first passing time from said at least one target aircraft, said at least one target aircraft having measured the first passing time when passing through said test point, and
   a recording unit for recording the received first passing time; and
   said second element comprises a measuring unit for measuring said second passing time when said referent aircraft passes through said test point.

2. The system as claimed in claim 1, which furthermore comprises a display unit for displaying, on at least one display screen, information indicating at least the guidance unit which is currently selected.

3. The system as claimed in claim 1, wherein when the referent aircraft is following a flight path different from a flight path followed by the at least one target aircraft, the two flight paths meeting at a point of convergence, said detection unit is configured to check for the existence of the risk of collision between the referent aircraft and the at least one target aircraft at said point of convergence.

4. A guidance system for a referent aircraft, said guidance system comprising a first guidance unit configured to generate automatically first guidance commands to guide the referent aircraft while maintaining at least a predetermined spacing between the referent aircraft and at least one target aircraft, the guidance system further comprising:
   a second guidance unit configured to generate second guidance commands to guide the referent aircraft such that the referent aircraft passes through at least one particular waypoint at a required passing time;
   a detection unit configured to detect automatically a risk of collision between the referent aircraft and the at least one target aircraft; and
   a selection unit configured to select automatically one of said first and second guidance units, said selected one of said first and second guidance units to then be used for guiding said referent aircraft, said selection unit being configured to select:
   said second guidance unit during a normal flight situation, in the absence of detection of the risk of collision by said detection unit; and
   said first guidance unit during a situation of danger, when said detection unit detects the risk of collision, said first guidance unit then being selected for as long as the risk of collision subsists,
   wherein when the referent aircraft is following the same flight path as the at least one target aircraft, said flight path exhibiting a plurality of successive waypoints, said detection unit is configured to check for the existence of the risk of collision between the referent aircraft and the at least one target aircraft at a location corresponding to at least one particular waypoint of said flight path, representing a test point,
   wherein said detection unit comprises:
   a first element for determining a first passing time corresponding to a time at which said at least one target aircraft passes said test point;
   a second element for determining a second passing time corresponding to a time at which said referent aircraft passes said test point;
   a computing element for determining, from said first and second passing times, a time spacing between the referent aircraft and the at least one target aircraft, at said test point; and
   a comparison element for comparing the time spacing with a predetermined spacing value and for deriving from the comparison:

the existence of the risk of collision when said time spacing is less than said predetermined spacing value, in which case the selection unit selects said first guidance unit; and the absence of the risk of collision when said time spacing is greater than or equal to said predetermined spacing value, in which case the selection unit selects said second guidance unit, wherein:

said first element comprises:

a first passing time receiving unit for receiving said first passing time from said at least one target aircraft, said at least one target aircraft having measured the first passing time when passing through said test point, and a recording unit for recording the received first passing time; and said second element comprises a predicting unit for predicting said second passing time.

5. The system as claimed in claim 4, which furthermore comprises a display unit for displaying, on at least one display screen, information indicating at least the guidance unit which is currently selected.

6. The system as claimed in claim 4, wherein when the referent aircraft is following a flight path different from a flight path followed by the at least one target aircraft, the two flight paths meeting at a point of convergence, said detection unit is configured to check for the existence of the risk of collision between the referent aircraft and the at least one target aircraft at said point of convergence.

7. A guidance system for a referent aircraft, said guidance system comprising a first guidance unit configured to generate automatically first guidance commands to guide the referent aircraft while maintaining at least a predetermined spacing between the referent aircraft and at least one target aircraft, the guidance system further comprising:

a second guidance unit configured to generate second guidance commands to guide the referent aircraft such that the referent aircraft passes through at least one particular waypoint at a required passing time;

a detection unit configured to detect automatically a risk of collision between the referent aircraft and the at least one target aircraft; and a selection unit configured to select automatically one of said first and second guidance units, said selected one of said first and second guidance units to then be used for guiding said referent aircraft, said selection unit being configured to select:

said second guidance unit during a normal flight situation, in the absence of detection of the risk of collision by said detection unit; and said first guidance unit during a situation of danger, when said detection unit detects the risk of collision, said first guidance unit then being selected for as long as the risk of collision subsists, wherein when the referent aircraft is following a flight path different from a flight path followed by the at least one target aircraft, the two flight paths meeting at a point of convergence, said detection unit is configured to check for the existence of the risk of collision between the referent aircraft and the at least one target aircraft at said point of convergence, wherein said detection unit comprises:

a first element for receiving and recording a first passing time corresponding to a passing time measured by said at least one target aircraft when said at least one target aircraft passes said point of convergence;

a second element for predicting a second passing time corresponding to a passing time, estimated in advance, of said referent aircraft at said point of convergence;

a computing element for determining, from said first and second passing times, a time spacing between the referent aircraft and the at least one target aircraft at said point of convergence; and a comparison element for comparing the time spacing with a predetermined spacing value and for deriving from the comparison:

the existence of the risk of collision when said time spacing is less than said predetermined spacing value, in which case the selection unit selects said first guidance unit; and the absence of the risk of collision when said time spacing is greater than or equal to said predetermined spacing value, in which case the selection unit selects said second guidance unit.

8. The system as claimed in claim 7, which furthermore comprises a display unit for displaying, on at least one display screen, info nation indicating at least the guidance unit which is currently selected.

9. The system as claimed in claim 7, wherein when the referent aircraft is following a flight path different from a flight path followed by the at least one target aircraft, the two flight paths meeting at a point of convergence, said detection unit is configured to check for the existence of the risk of collision between the referent aircraft and the at least one target aircraft at said point of convergence.

* * * * *